Jan. 15, 1924.　　　　　　　1,480,608
C. W. GARDNER
AIR VALVE
Filed April 17, 1922　　2 Sheets-Sheet 1

E. F. Gardner
executrix of
C. W. Gardner decd.
Inventor.
By C. A. Snow & Co.
Attorneys.

Jan. 15, 1924.
C. W. GARDNER
AIR VALVE
Filed April 17, 1922
1,480,608
2 Sheets-Sheet 2
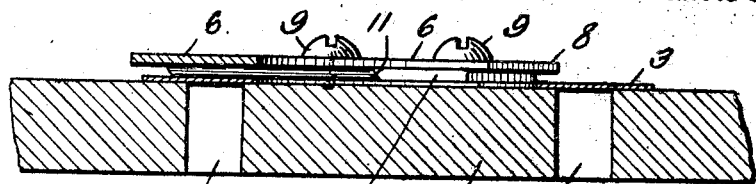
Fig. 4.
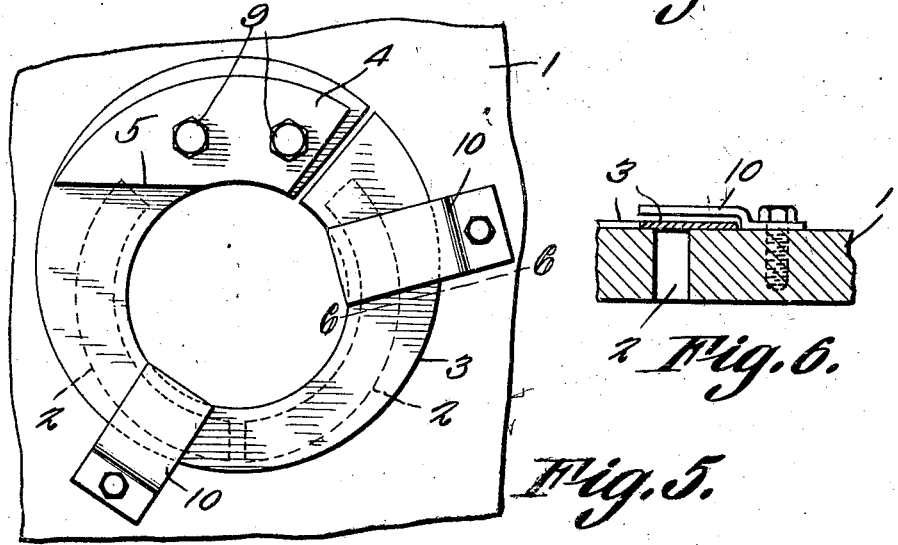
Fig. 5.
Fig. 6.
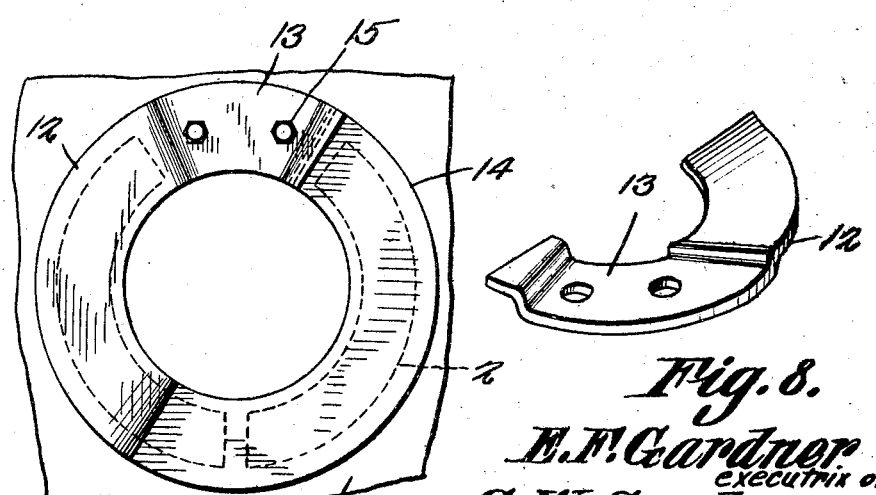
Fig. 7.
Fig. 8.
E. F. Gardner
executrix of
C. W. Gardner dec'd
Inventor.
By
Attorneys.

Patented Jan. 15, 1924.

1,480,608

UNITED STATES PATENT OFFICE.

CHARLES W. GARDNER, DECEASED, LATE OF AUSTIN, TEXAS; BY ELIZABETH F. GARDNER, EXECUTRIX, OF AUSTIN, TEXAS.

AIR VALVE.

Application filed April 17, 1922. Serial No. 554,316.

*To all whom it may concern:*

Be it known that CHARLES W. GARDNER, deceased, formerly a citizen of the United States, residing at Austin, in the county of Travis and State of Texas, invented a new and useful Air Valve, of which the following is a specification.

This invention relates to an air valve designed primarily for use in connection with internal combustion engines although it can be used efficiently in connection with compressors of air, gas or liquid or any other machines requiring a quick acting and efficient valve.

One of the objects of the invention is to provide a light and strong valve which does not require a stem and a guide, both of which are subject to rapid wear.

Another object is to provide a valve which will not hammer and which, by reason of its peculiar construction, will not tend to buckle the material of which the valve is constructed.

Another object is to provide a valve the movable portion of which is capable of flexing along straight lines so that the life of the valve is greatly prolonged as compared with any valve which tends to crinkle or buckle when flexed.

Another object is to provide a valve which while capable of flexing readily to meet all requirements, is not objectionably limber but has a steady action tending to overcome rapid vibration or fluttering.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred forms of the invention have been shown.

In said drawings—

Figure 4 is a section on line 4—4, Figure 2.

Figure 5 is an elevation of a slightly modified form of valve.

Figure 6 is a section on line 6—6, Figure 5.

Figure 7 is an elevation of another modification.

Figure 8 is a perspective view of the valve spacer used in Figure 7.

Referring to the figures by characters of reference 1 designates a portion of an internal combustion engine provided with opposed arcuate air intake ports 2 adapted to be closed normally by the valve constituting the present invention.

Figure 1:
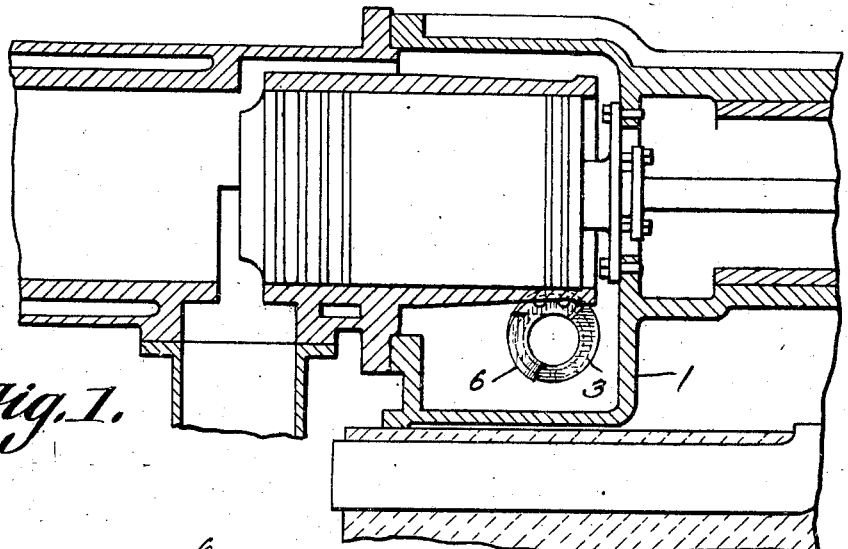
Figure 1 is a section through a portion of an internal combustion engine and showing the air inlet valve in position.
Figures 2, 3:
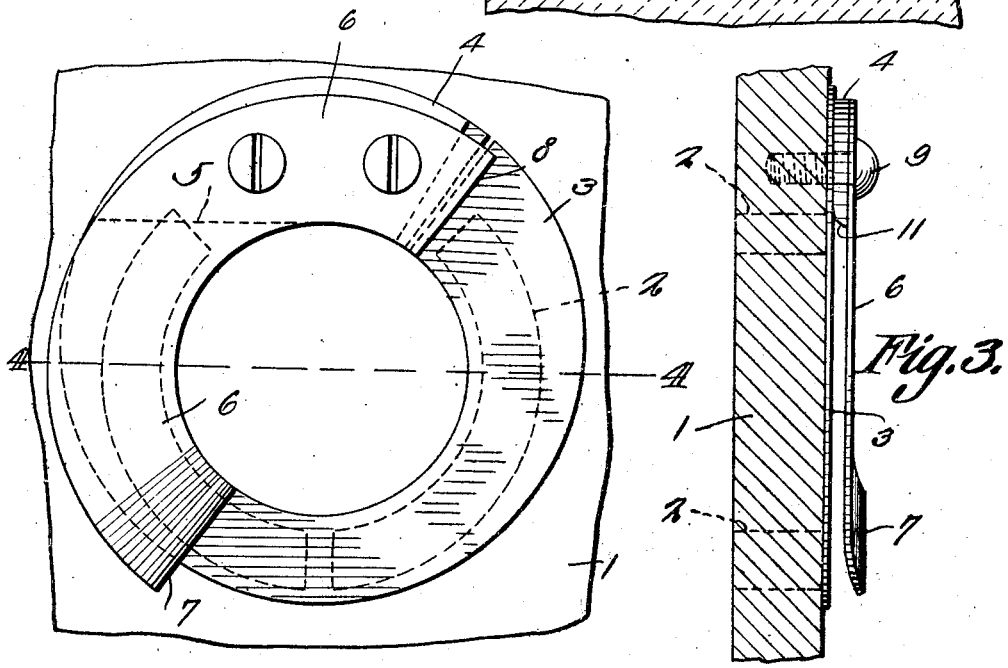
Figure 2 is a face view of the valve.
Figure 3 is a side elevation thereof.

In the form of valve shown in Figures 2, 3 and 4 there is provided a split flat ring 3 of spring metal which can be suitably treated to prevent it from rusting or corroding. For example if the ring is of hard rolled sheet steel it may be coated with copper, tin, lead or other suitable material. The ring and the ports are concentric with the same axis and there is mounted on one end portion of the ring 3 a spacer 4 the outer edge of which is close to the corresponding edge of the ring 3 while the inner edge is tangent to the circle defined by the inner edge of the ring, as shown at 5, one end of the spacer being preferably radially disposed relative to the axis of the inner circle of the ring.

It will be noted by referring particularly to Figure 2 that the inner and outer edges of the ring 3 are not concentric and that while the inner circle of the ring is concentric with the axis about which the ports 2 are formed, the outer circle of the ring is eccentrically disposed with respect to said axis so that the end portions of the ring are thus wider than the intermediate portions.

For the purpose of limiting the movement of the valve ring 3 away from the ports 2 there is provided an arcuate stop strip 6 mounted at one end on the spacer 4 while its other end extends a desired distance over the ring 3 and is preferably slightly outturned as shown at 7. One end of this stop can be projected beyond the spacer 4 to provide a means for limiting the movement of the free end of the ring 3, this projecting portion or stop being indicated at 8.

The stop is held in place in any suitable manner, as by means of screws 9 extending therethrough and through the spacer 4 and one end portion of the ring 3. All of the parts are thus held properly assembled.

It will be apparent that by providing a valve such as has been described the same can open readily and during each flexing of the valve it will bend along straight lines substantially parallel with the straight edge 5 of the spacer 4. Thus there is no tendency of the valve to buckle and, consequently, it will last much longer than should a buckling action take place. The stop 6 serves properly to limit the movement of the ring 3 when moved away from the ports 2, thus preventing excessive lift without interfering with the flow of or tilting the air.

Obviously different kinds of stops can be used for limiting the movement of the valve. Instead of providing the arcuate stop shown in Figure 2, spaced stop brackets 10 can be positioned to lap the ring 3 at different points as shown in Figures 5 and 6. With this arrangement the spacer 4 will remain exposed and the bolts or screws 9 are used solely for fastening the ring and the spacer 4 to the engine. With this arrangement the spacer does not act as such but merely provides a straight edge 5 along which the valve ring can bend or flex during the action thereof. It will be noted by referring particularly to Figure 4 that the straight edge 5 of the part 4 is undercut or rounded at 11 thus to present a proper bearing surface for the valve ring 3 when flexing.

In Figure 8 there has been shown a combined stop and spacer formed in one piece, thus simplifying the structure heretofore described. In this modified construction there is provided a substantially arcuate strip 12 having an intermediate offset portion 13. This modified form of stop is adapted to be mounted on one end portion of the ring 14 so that the offset portion 13 will rest on the ring and be fastened thereto and to the engine structure by bolts 15 extending therethrough. One end portion of the stop will extend over a part of the ring 14 while the other end of the stop will lap one of the free ends of the ring. While this construction will operate efficiently for a certain time, it does not possess the advantages of the structure shown in Figures 1 to 6 because of the tendency of the ring 14 to buckle or crinkle where flexed adjacent its point of connection with the offset portion 13 of the stop. By making the inner and outer margins of the valve rings eccentric as shown in Figure 5 the bending line along the straight edge 5 of the spacer 4 is materially lengthened and the strength of the ring is thus correspondingly increased. Furthermore a much broader bearing is provided at the free end of the split ring than would be obtained should the inner and outer margins of the ring be concentric.

What is claimed is:—

1. An air valve comprising a flat resilient split ring, fastening means secured on one end portion of the ring and providing a bending edge tangent to the inner edge of the ring.

2. An air valve including a flat resilient split ring having eccentrically disposed inner and outer margins, and attaching means secured on the ring near one end thereof and providing a straight bending edge for the ring tangent to the inner margin of the ring.

3. An air valve including a flat resilient ring having its inner and outer margins eccentrically disposed, said ring being split in the wide portion thereof, fastening means secured on one end of the ring and having a straight bending edge on the wide portion of the ring and tangent to the inner edge thereof.

4. An air valve including a flat resilient ring having its inner and outer margins eccentrically disposed to provide a broad portion, said ring being split radially within the broad portion, attaching means secured on the broad portion of the ring and providing a straight bending edge tangent to the inner circle of the ring, that portion of said edge adjacent the ring being undercut.

5. An air valve including a flat resilient ring having its inner and outer margins eccentrically disposed to provide a broad portion, said ring being split radially within the broad portion, attaching means secured on the broad portion of the ring and providing a straight bending edge tangent to the inner circle of the ring, that portion of said edge adjacent the ring being undercut, and a stop lapping the ring to limit its lift.

6. An air valve including a flat resilient ring having its inner and outer margins eccentrically disposed to provide a broad portion, said ring being split radially within the broad portion, attaching means secured on the broad portion of the ring and providing a straight bending edge tangent to the inner circle of the ring, that portion of said edge adjacent the ring being undercut, and stops lapping the free end and an intermediate portion of the ring.

In testimony that I claim the foregoing as the invention of the said CHARLES W. GARDNER, I have hereto affixed by signature in the presence of two witnesses.

ELIZABETH F. GARDNER,
*Executrix of Charles W. Gardner, Deceased.*

Witnesses:
H. A. D. WHITE,
ELLA V. EVERITT.